(12) United States Patent
Awtry et al.

(10) Patent No.: US 10,662,804 B2
(45) Date of Patent: May 26, 2020

(54) PROFILED BELLCRANK VANE ACTUATION SYSTEM

(71) Applicant: UNITED TECHNOLOGIES CORPORATION, Farmington, CT (US)

(72) Inventors: Eric Weston Awtry, Hartford, CT (US); Kevin Kassel, Meriden, CT (US)

(73) Assignee: United Technologies Corporation, Farmington, CT (US)

( * ) Notice: Subject to any disclaimer, the term of this patent is extended or adjusted under 35 U.S.C. 154(b) by 151 days.

(21) Appl. No.: 15/907,401

(22) Filed: Feb. 28, 2018

(65) Prior Publication Data

US 2019/0264706 A1 Aug. 29, 2019

(51) Int. Cl.
*F01D 17/16* (2006.01)
*F02C 3/06* (2006.01)
*F04D 29/56* (2006.01)

(52) U.S. Cl.
CPC .............. *F01D 17/162* (2013.01); *F02C 3/06* (2013.01); *F04D 29/563* (2013.01); *F05D 2220/323* (2013.01); *F05D 2260/50* (2013.01); *F05D 2260/56* (2013.01)

(58) Field of Classification Search
CPC ...... F01D 17/162; F01D 17/165; F01D 17/14; F01D 17/16; F02C 3/06; F04D 29/563; F05D 2220/323; F05D 2260/56
See application file for complete search history.

(56) References Cited

U.S. PATENT DOCUMENTS

| | | | |
|---|---|---|---|
| 3,066,488 A * | 12/1962 | Mock | F01D 17/162 60/795 |
| 4,275,560 A * | 6/1981 | Wright | F02K 3/075 415/148 |
| 4,546,606 A * | 10/1985 | Bouiller | F01D 17/162 137/601.05 |
| 8,333,546 B2 | 12/2012 | Colotte et al. | |
| 10,301,961 B2 * | 5/2019 | Davis | F04D 29/164 |
| 2005/0129510 A1 * | 6/2005 | Raine | F01D 17/162 415/155 |
| 2010/0158663 A1 * | 6/2010 | Colotte | F01D 17/16 415/33 |
| 2014/0010637 A1 * | 1/2014 | Pudvah | F01D 17/162 415/130 |

FOREIGN PATENT DOCUMENTS

| | | |
|---|---|---|
| EP | 1387041 A2 | 4/2004 |
| GB | 2479064 A | 9/2011 |

OTHER PUBLICATIONS

CodeCogs, Cmas, Nov. 11, 2012; Retrieved from the Internet on Aug. 18, 2019 (Year: 2012).*
European Search Report for European Application No. 19159866.3, dated Aug. 8, 2019.

* cited by examiner

*Primary Examiner* — David E Sosnowski
*Assistant Examiner* — Sang K Kim
(74) *Attorney, Agent, or Firm* — Carlson, Gaskey & Olds, P.C.

(57) ABSTRACT

A variable vane assembly according to an example of the present disclosure includes an actuator. A connection linkage is pivotable by the actuator. A component receives direct input from the connection linkage providing a cam surface. A driving linkage is interfaced with the cam surface. A variable vane is coupled to the driving linkage. The pivoting of the component and cam surface causes the driving linkage to pivot the vane.

20 Claims, 10 Drawing Sheets

PROFILED BELLCRANK VANE ACTUATION SYSTEM

BACKGROUND

This disclosure relates to gas turbine engines, and more particularly to variable vane assemblies in gas turbine engines.

Gas turbine engines typically include one or more compressor sections, a combustor section, and one or more turbine sections. In some gas turbine engines, variable vanes are included, such as in the compressor section. Such variable vanes can be pivoted to different angles suitable for different operating conditions of the gas turbine engine. A mechanical linkage is typically used to pivot the variable vanes.

Mechanical linkages in the prior art utilize an actuator to pivot a bellcrank to pivot variable vanes. A bellcrank is a crank having multiple arms that pivot about a pivot point where the arms meet. Links are typically connected to the arms, such that when a force is applied by one of the links to its connected arm, all arms pivot about the pivot point, causing the other connected links to move. In the prior art variable vane systems, the bellcrank includes an arm directly connected to a driving linkage that drives the variable vanes to pivot.

SUMMARY

A variable vane assembly according to an example of the present disclosure includes an actuator. A connection linkage is pivotable by the actuator. A component receives direct input from the connection linkage, which provides a cam surface. A driving linkage is interfaced with the cam surface. A variable vane is coupled to the driving linkage, and the pivoting of the component and cam surface causes the driving linkage to pivot the vane.

In a further embodiment according to any of the foregoing embodiments, the component is a profiled bellcrank.

In a further embodiment according to any of the foregoing embodiments, the component includes a profiled arm, which provides the cam surface and a linking arm.

In a further embodiment according to any of the foregoing embodiments, the linking arm is coupled to the connection linkage.

In a further embodiment according to any of the foregoing embodiments, the profiled arm and the linking arm extend from a rotation portion, and the component is pivotable about a pivot point at the rotation portion.

In a further embodiment according to any of the foregoing embodiments, the connection linkage includes a bellcrank coupled to a fourbar, the bellcrank is different from the profiled bellcrank, and the profiled bellcrank is coupled to the fourbar.

In a further embodiment according to any of the foregoing embodiments, the driving linkage includes a follower having a rotatable disk that interfaces with the cam surface.

In a further embodiment according to any of the foregoing embodiments, the driving linkage includes a link coupled to the follower, a ring coupled to the link, and a vane arm coupled to the ring and the variable vane.

In a further embodiment according to any of the foregoing embodiments, pivoting of the component causes the disk to rotate along the cam surface, which drives the follower to move linearly. Linear movement of the follower rotates the ring through the link, and rotation of the ring pivots the variable vane through the vane arm.

In a further embodiment according to any of the foregoing embodiments, the follower includes a main body portion and a tapered end portion that extends from the main body portion, and the disk is received in the tapered end portion.

In a further embodiment according to any of the foregoing embodiments, the cam surface is convex.

A gas turbine engine according to an example of the present disclosure includes a compressor and a variable vane assembly of the compressor that includes an actuator. A connection linkage is pivotable by the actuator. A component receives direct input from the connection linkage and provides a cam surface. A driving linkage is interfaced with the cam surface. A variable vane is coupled to the driving linkage, and the pivoting of the component and cam surface causes the driving linkage to pivot the vane.

In a further embodiment according to any of the foregoing embodiments, the component is a profiled bellcrank.

In a further embodiment according to any of the foregoing embodiments, the component includes a profiled arm which provides the cam surface and a linking arm.

In a further embodiment according to any of the foregoing embodiments, the linking arm is coupled to the connection linkage.

In a further embodiment according to any of the foregoing embodiments, the profiled arm and the linking arm extend from a rotation portion, and the component is pivotable about the pivot point at the rotation portion.

In a further embodiment according to any of the foregoing embodiments, the driving linkage includes a follower having a rotatable disk that interfaces with the cam surface, a link coupled to the follower, a ring coupled to the link, and a vane arm is coupled to the ring and the variable vane.

In a further embodiment according to any of the foregoing embodiments, pivoting of the component causes the disk to rotate along the cam surface, which drives the follower to move linearly. Linear movement of the follower rotates the ring through the link, and rotation of the ring pivots the variable vane through the vane arm.

In a further embodiment according to any of the foregoing embodiments, the follower moves linearly in a direction that is substantially tangential to the rotation of the ring.

A variable vane assembly according to an example of the present disclosure includes a linear actuator. A connection linkage includes a direct bellcrank with a first arm and a second arm. The first arm receives input from the linear actuator. A fourbar is coupled to the second arm. A profiled bellcrank includes a rotation portion that provides a pivot point. A profiled arm provides a cam surface and extends from the rotation portion. A linking arm extends from the rotation portion and is coupled to the fourbar. A follower has a rotatable disk that interfaces with the cam surface, and the follower is linearly movable within a fixed sleeve. A link is coupled to the follower. A ring is coupled to the link. A plurality of vane arms is coupled to the ring. A variable vane is coupled to each of the plurality of vane arms. Pivoting of the profiled bellcrank about the pivot point causes the disk to rotate along the cam surface, which drives the follower to move linearly within the sleeve. Linear movement of the follower rotates the ring through the link, and rotation of the ring pivots each variable vane through the plurality of vane arms.

These and other features disclosed herein can be best understood from the following specification and drawings, the following of which is a brief description.

DETAILED DESCRIPTION

Figure 1:
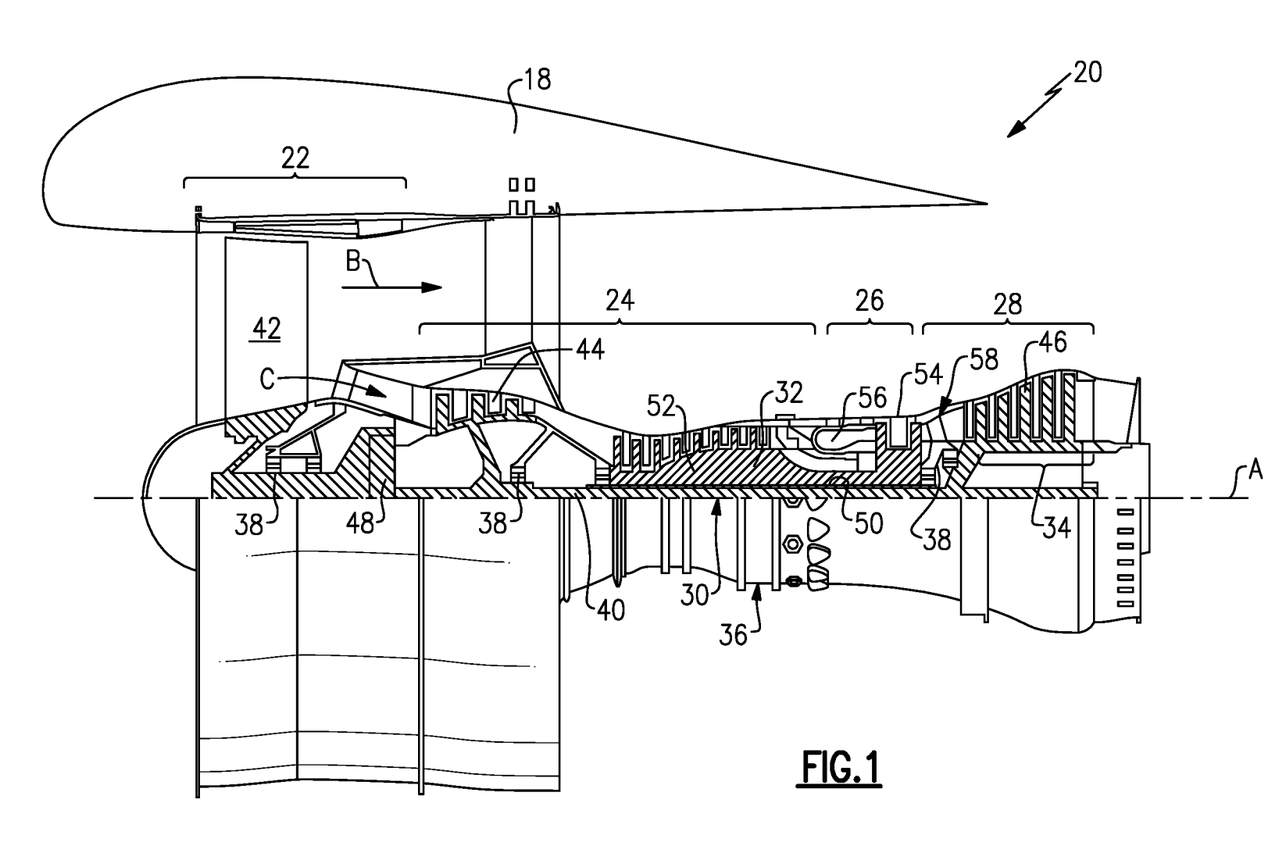
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction read [(Tram ° R)/(518.7° R)]^0.5. The "Low corrected fan tip speed" as disclosed herein according to one non-limiting embodiment is less than about 1150 ft/second (350.5 meters/second).

Figure 2:
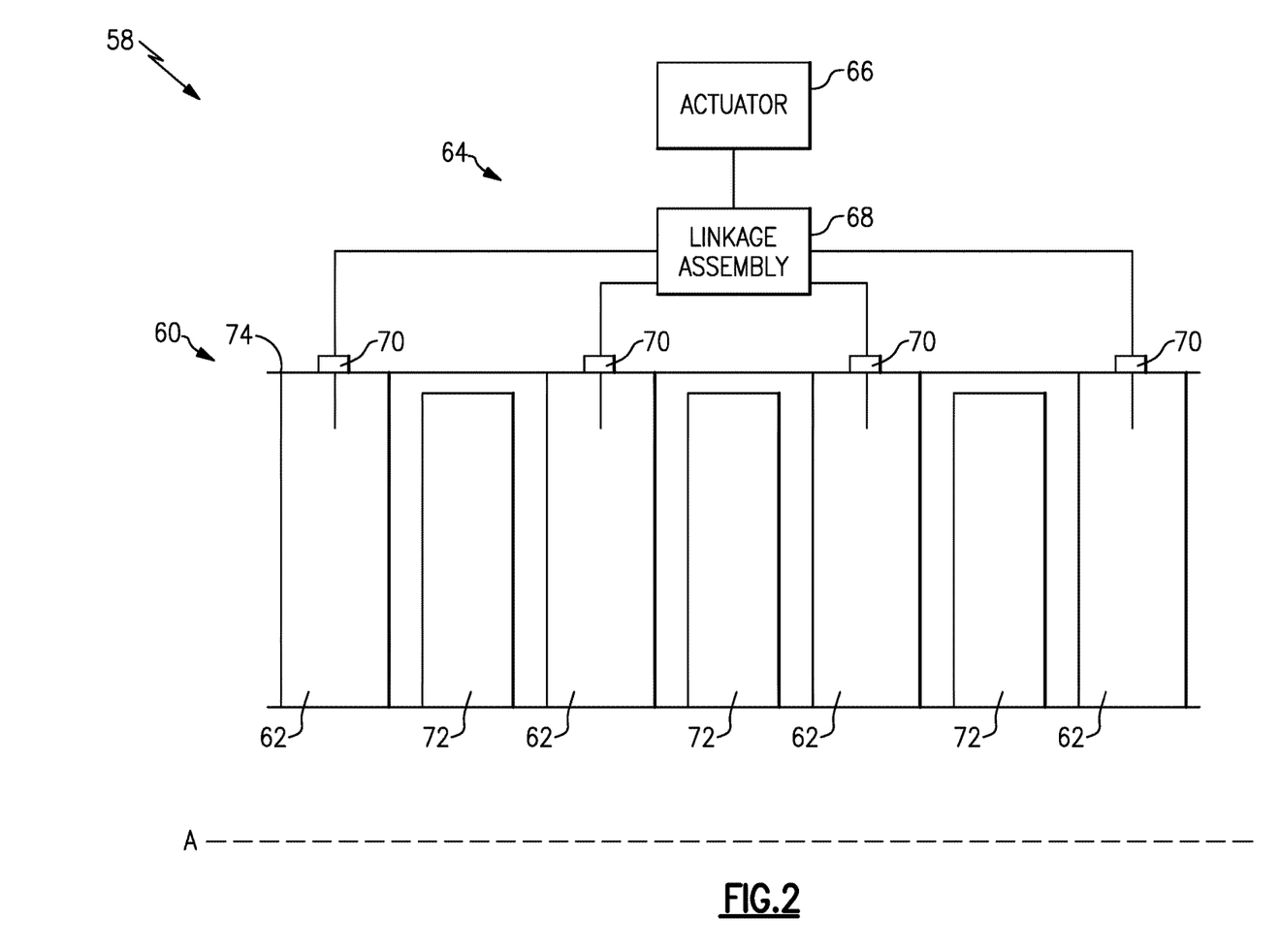
FIG. 2 schematically illustrates a section of a gas turbine engine.

FIG. 2 schematically illustrates a section 58 of a gas turbine engine. The example section 58 is the high pressure compressor 52 of the engine 20 arranged about the engine central longitudinal axis A. However, other sections of a gas turbine engine, including a low pressure compressor or a turbine section, may benefit from this disclosure. The section 58 includes a variable vane assembly 60, including one or more axially-spaced stages of variable vanes 62 driven by a variable vane actuation system 64. The variable vane actuation system 64 includes an actuator 66 that drives a linkage assembly 68 coupled to one or more of the variable vanes 62 to cause the variable vanes 62 to pivot, such as on a spindle 70. The variable vanes 62 may be pivoted to adjust their angle to improve performance of the gas turbine engine 20 in different operating conditions. The section 58 includes alternating rows of variable vanes 62 and rotating blades 72, which are opposite a case 74 from the vane actuation system 64. The reasons a designer may want the angles of the variable vanes 62 to change at various operating conditions are known. This disclosure relates to how the system 64 changes the angles.

Figure 3:
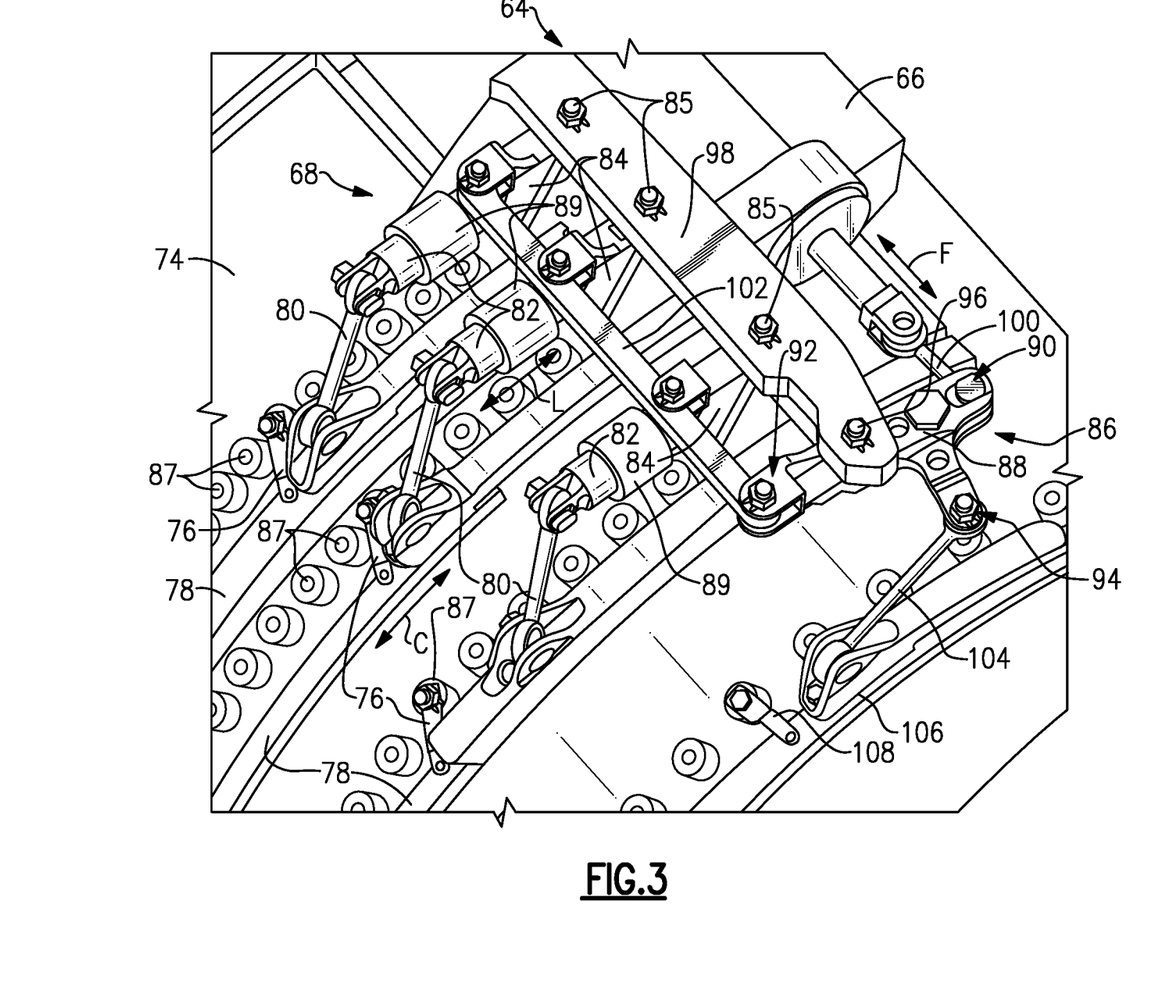
FIG. 3 illustrates an example vane actuation system.

FIG. 3 illustrates an example variable vane actuation system 64 viewed from the opposite side of the case 74 from the variable vanes 62 (not seen in FIG. 3). The actuation system 64 includes an actuator 66 for driving a linkage assembly 68. The linkage assembly 68 includes vane arms 76, rings 78, links 80, followers 82, profiled bellcranks 84, and a connection linkage assembly 86. The case 74 includes axially-spaced rows of circumferentially-spaced openings 87 through which corresponding variable vanes 62 (FIG. 2) can be driven for rotation. The openings 87 may extend about all or a portion of the circumference of the case 74, and the number and spacing of the openings 87 shown in FIG. 3 is not intended to limit this disclosure. Vane arms 76 are each coupled at one end to a variable vane 62 through an opening 87, where spindle 70 (FIG. 2) is located, and the other end to a ring 78. Although one vane arm 76 is shown per ring 78 in FIG. 3 for ease of viewing, multiple vane arms 76 per ring 78 may be utilized, such as one vane arm 76 per opening 87. The rings 78 may be fully annular about the case 74 or may only extend circumferentially about a portion of the case 74. Circumferential movement C of the ring 78 causes the vane arm 76 to pivot about a pivot point in the opening 87, which in turn causes the variable vane 62 to pivot.

The circumferential movement C of each ring 78 is driven by a respective follower 82 through a link 80. Specifically, each link 80 is coupled at one end to a ring 78 and an opposite end to a follower 82. The example links 80 are linear. Linear movement L of the follower 82 therefore drives the respective ring 78 in the circumferential direction C through the link 80. Each follower 82 may be received within a fixed sleeve 89 that guides movement of the follower 82 in the linear direction L. Profiled bellcranks 84, as illustrated and described in greater detail below, each provide a surface, such as a cam surface, that interfaces with a respective follower 82. Accordingly, with the profiled bellcrank 84 and follower 82 engaged, pivoting of the profiled bellcranks 84 about their respective fixed pivot points 85 drives the desired linear movement L of the followers 82.

The example connection linkage 86 utilizes a direct bellcrank 88 to receive input from the actuator 66 and drive the profiled bellcranks 84 to pivot as desired. Other connection linkages may be utilized for this purpose. The direct bellcrank 88 includes a first arm 90, a second arm 92, and a third arm 94 that meet at a fixed pivot point 96. The direct bellcrank 88 is different from the profiled bellcranks 84; instead of having a profiled surface for engaging a follower, the direct bellcrank 88 has a third arm 94 coupled to a link 104 coupled to a ring 106 for driving one or more vane arms 108. The direct bellcrank 88 is rotatably attached at a fixed pivot point 96 to a bar 98 fixed to the case 74, such as through fasteners or welding (not shown), for example. The profiled bellcranks 84 are also rotatably attached to the bar 98 at the fixed pivot points 85. The example actuator 66 is a linear actuator having an output in the direction F, which drives a dogbone link 100 coupled to the first arm 90 of the direct bellcrank 88, pivoting the direct bellcrank 88 about the pivot point 96. The second arm 92 of the direct bellcrank 88 is coupled to a fourbar 102, which is also coupled to the profiled bellcranks 84. As explained and illustrated further below, pivoting the direct bellcrank 88 moves the fourbar 102, which causes the profiled bellcranks 84 to pivot, resulting in linear movement L of the followers 82 for driving the rings 78 in the circumferential direction C.

In some examples, the ring 106 and vane arms 108 may drive variable vanes in an inlet guide vane stage of the compressor 52, and the rings 78 and vane arms 76 may drive variable vanes in downstream variable vane stages. In the illustrative example, one stage is driven by the third arm 94 of direct bellcrank 88, and three stages are driven by profiled bellcranks 84, but more or fewer stages may be driven by the profiled bellcranks 84. The number of stages in the example is not intended to be limiting.

Figure 4A:
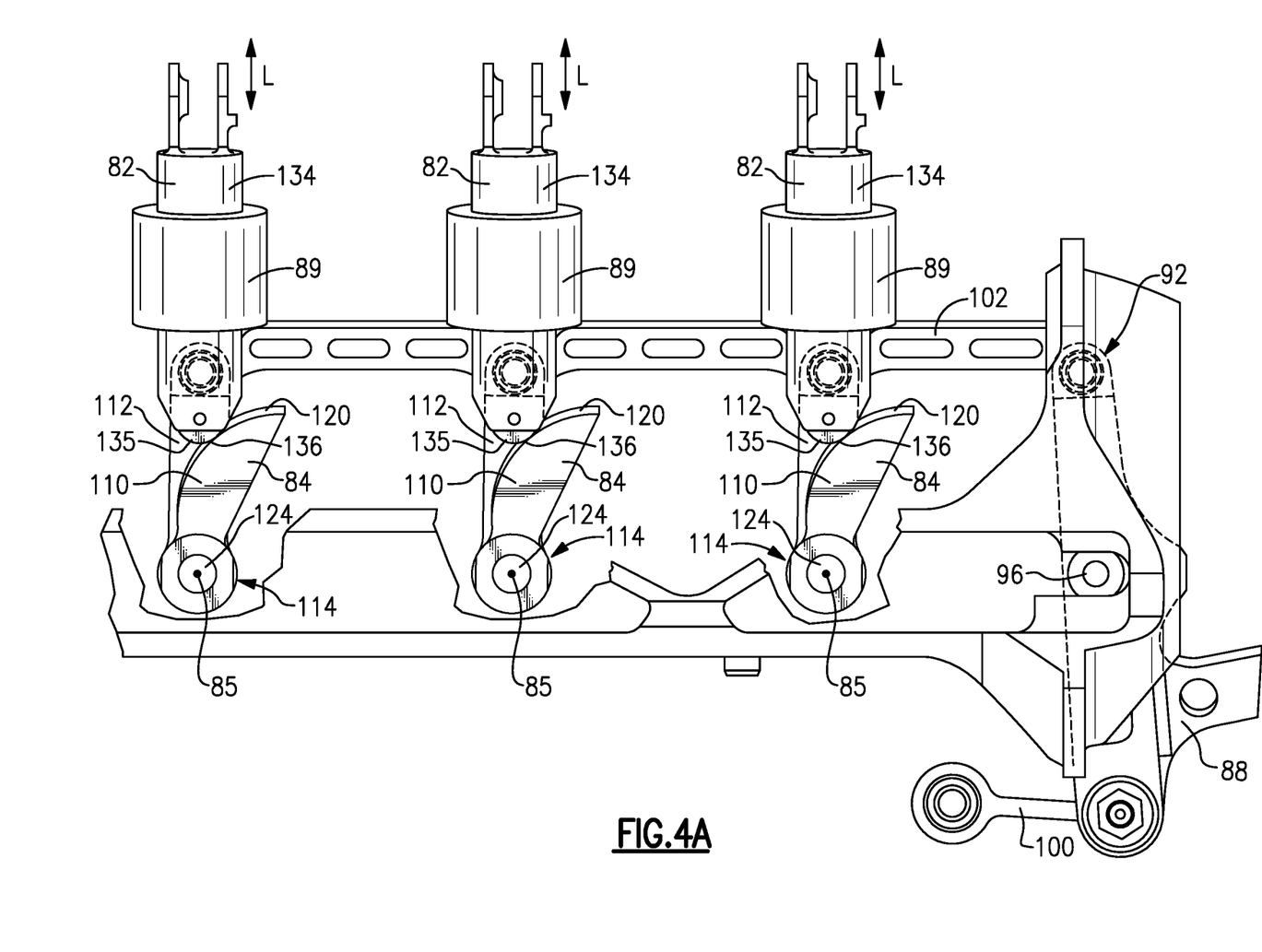
FIG. 4A illustrates a portion of an example linkage assembly.

FIG. 4A illustrates the portion of the linkage assembly 68 where the followers 82 engage the respective profiled bellcranks 84. Each follower 82 includes a rotatable disk 135 having an outer surface 136 that interfaces with a cam surface 120 of a profiled arm 110 of a respective profiled bellcrank 84. In the example, the cam surface 120 is curved. In another example, the cam surface 120 may be angled. A linking arm 112 of each profiled bellcrank 84 is coupled to the fourbar 102, and the fourbar 102 is also coupled to the first arm 92 of the direct bellcrank 88. The profiled arm 110 and the linking arm 112 meet at the rotation portion 114, which provides the fixed pivot point 85. Pivoting of the direct bellcrank 88 about pivot point 96 moves the fourbar 102, which causes the profiled bellcranks 84 to pivot about their fixed pivot points 85. As the profiled bellcranks 84 pivot, the disks 135 move along the respective cam surfaces 120, causing the follower 82 to move in the direction L.

Each fixed pivot point 85 is provided by a rotation portion 114 of the profiled bellcrank 84 being rotatably attached to the bar 98 (portions of the bar 98 removed for viewing). In some examples, a pin or other fastener (not shown) may be received in the opening 124 to allow the profiled bellcrank 84 to pivot about the fixed pivot point 85. Each follower 82 includes a main body portion 134 received and movable within a respective fixed sleeve 89, which may be fixed to the bar 98 or the case 74 (FIG. 3), for example.

Figure 4B:
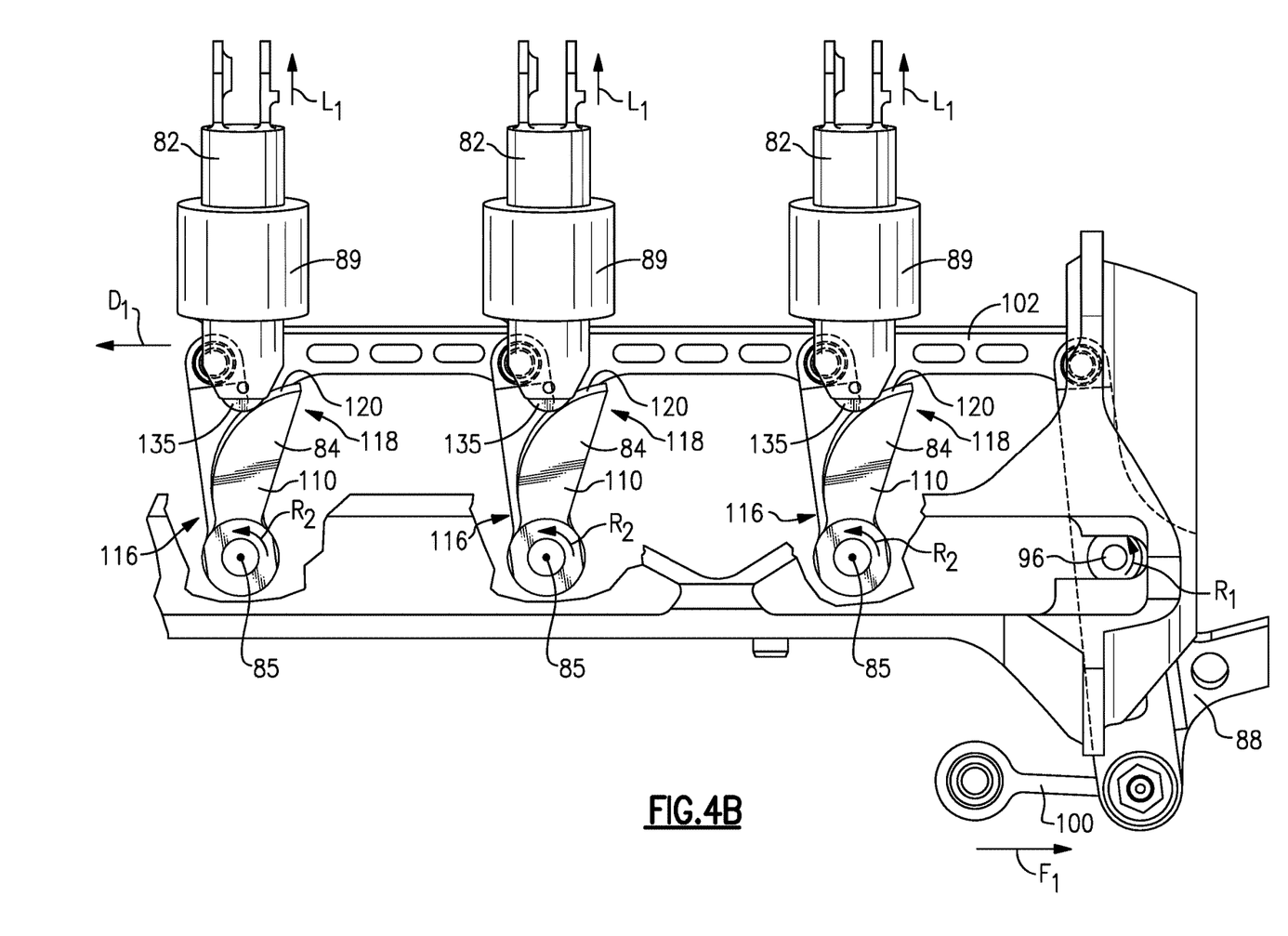
FIG. 4B illustrates the portion of the example linkage assembly shown in FIG. 4A at a second position.

FIG. 4B illustrates the portion of the linkage assembly 68 shown in FIG. 4A, except that the followers 82 have been driven in the direction L1 to a second position. The dogbone 100 is driven in the direction F1, such as by actuator 66 (not shown), causing the direct bellcrank 88 to pivot about the fixed pivot point 96 in the direction RE The fourbar 102 moves in the direction D1 causing the profiled bellcranks 84 to pivot about fixed pivot points 85 in the direction R2. Pivoting R2 causes the profiled bellcranks 84 to drive the followers 82 in the direction L1, by the rotatable disk 135 moving along the cam surface 120 in a direction from the first end 116 of the profiled portion 110 toward the second end 118. The sleeves 89 remain fixed.

Figure 4C:
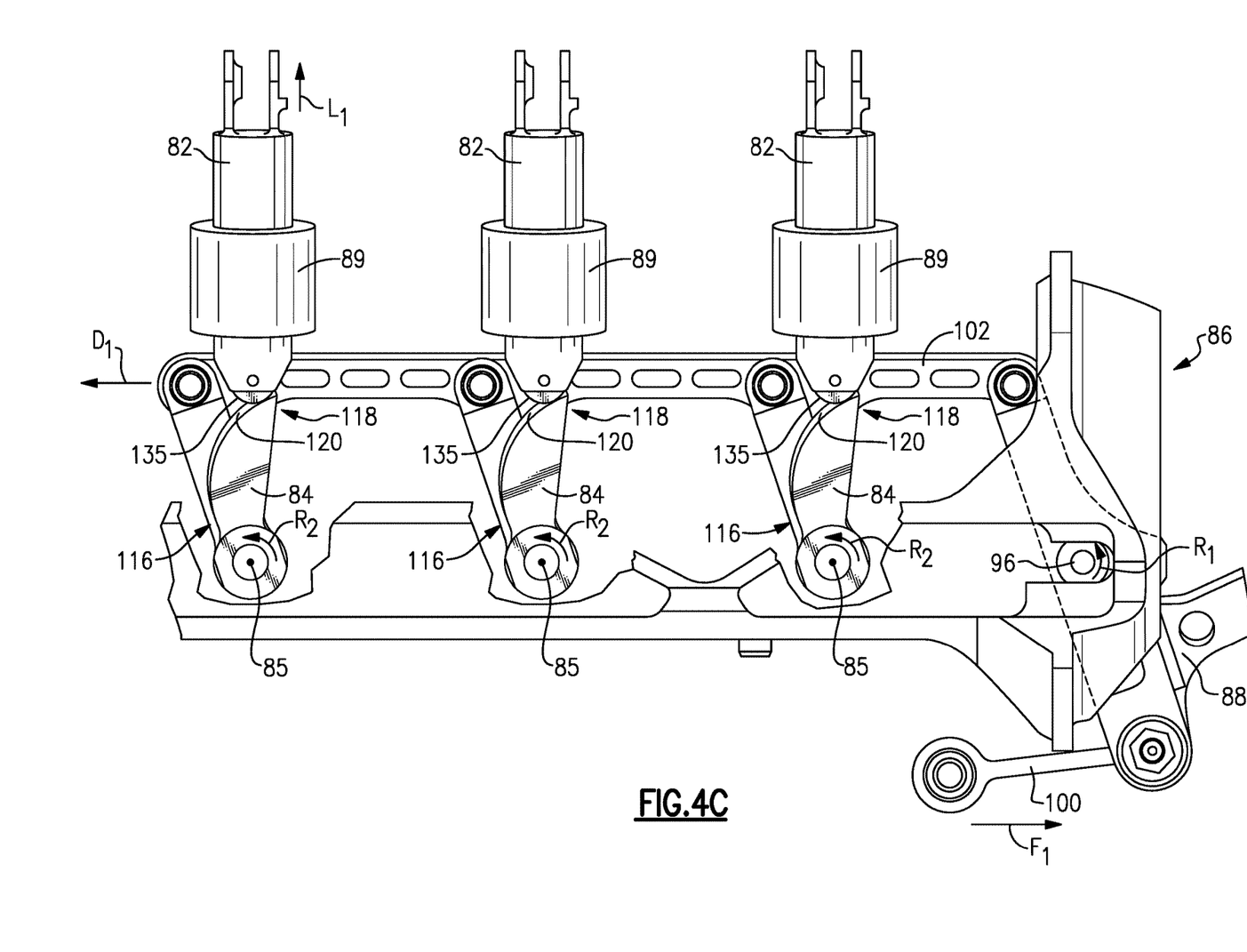
FIG. 4C illustrates the portion of the example linkage assembly shown in FIGS. 4A and 4B at a third position.

FIG. 4C illustrates the portion of the linkage assembly 68 shown in FIGS. 4A and 4B, except that the followers 82 have been driven in the direction L1 to a third position. The dogbone 100 is driven farther in the direction F1 causing additional pivoting of the direct bellcrank 88 about the fixed pivot point 96 in the direction R1. The fourbar 102 therefore moves farther in the direction D1 causing additional pivoting of the profiled bellcranks 84 about fixed pivot points 85 in the direction R2. Additional pivoting R2 causes the profiled bellcranks 84 to drive the followers 82 farther in the direction L1, by the rotatable disk 135 moving along the cam surface 120 in a direction from the first end 116 toward the second end 118. The sleeves 89 remain fixed.

Referring back to FIG. 3, the direction L1 in FIGS. 4B and 4C is along the direction L shown in FIG. 3. By adjusting the variable vanes with the linear movement L of the followers 82 that is substantially tangential to the circumferential movement C of the rings 78, the disclosed system 64 provides improved spatial savings and clearance relative to prior art systems. Specifically, for vanes driven by profiled bellcranks 84, the links 80 are driven by linearly moving followers 82. These linearly moving followers 82 require less space than standard bellcranks directly connected to links that drive their connected links through a rotating sweep angle motion. Moreover, the profiled bellcranks 84 are customizable and easily interchangeable within the linkage assembly 68 to meet a desired variable vane schedule.

Figure 5:
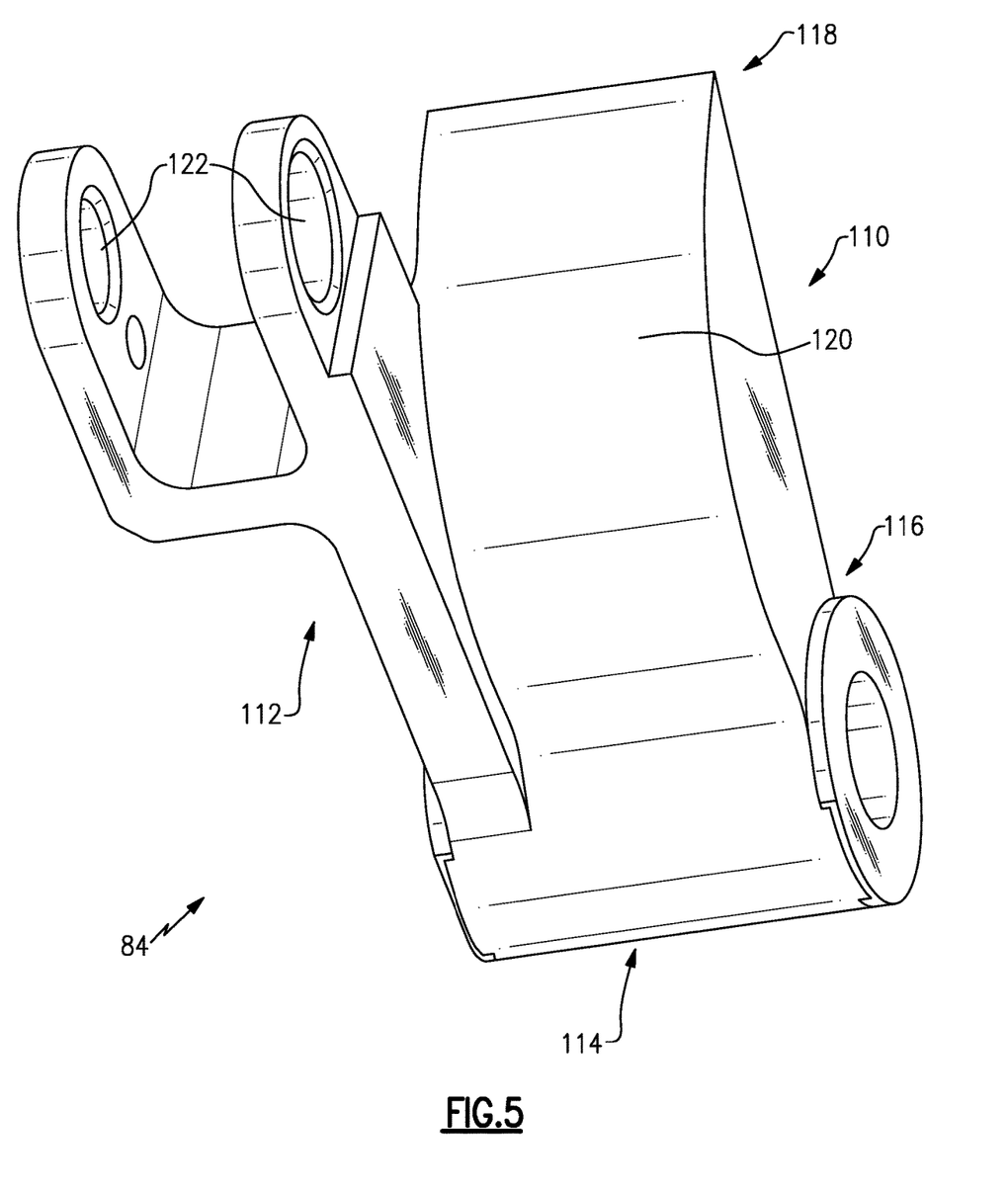
FIG. 5 illustrates an example profiled bellcrank.

FIG. 5 illustrates an example profiled bellcrank 84. The profiled bellcrank 84 includes a profiled arm 110, a linking arm 112, and a rotation portion 114. The profiled arm 110 and the linking arm 112 extend from the rotation portion 114 and are offset from one another relative to the rotation portion 114. The profiled arm 110 includes a first end 116, a second end 118, and a cam surface 120 extending from the first end 116 to the second end 118. The cam surface is an outer surface of the profiled portion 110. The cam surface 120 may extend along a lesser distance of the profiled portion 110 in other examples. The example cam surface 120 is curved and convex. For a curved cam surface 120, the curvature may be customized for a desired variable vane schedule, which is the amount of pivoting desired for an associated variable vane. The example linking arm 112 includes one or more openings 122 for coupling the profiled bellcrank 84 to another component, such as the fourbar 102 shown in FIGS. 3-4C.

Figure 6:
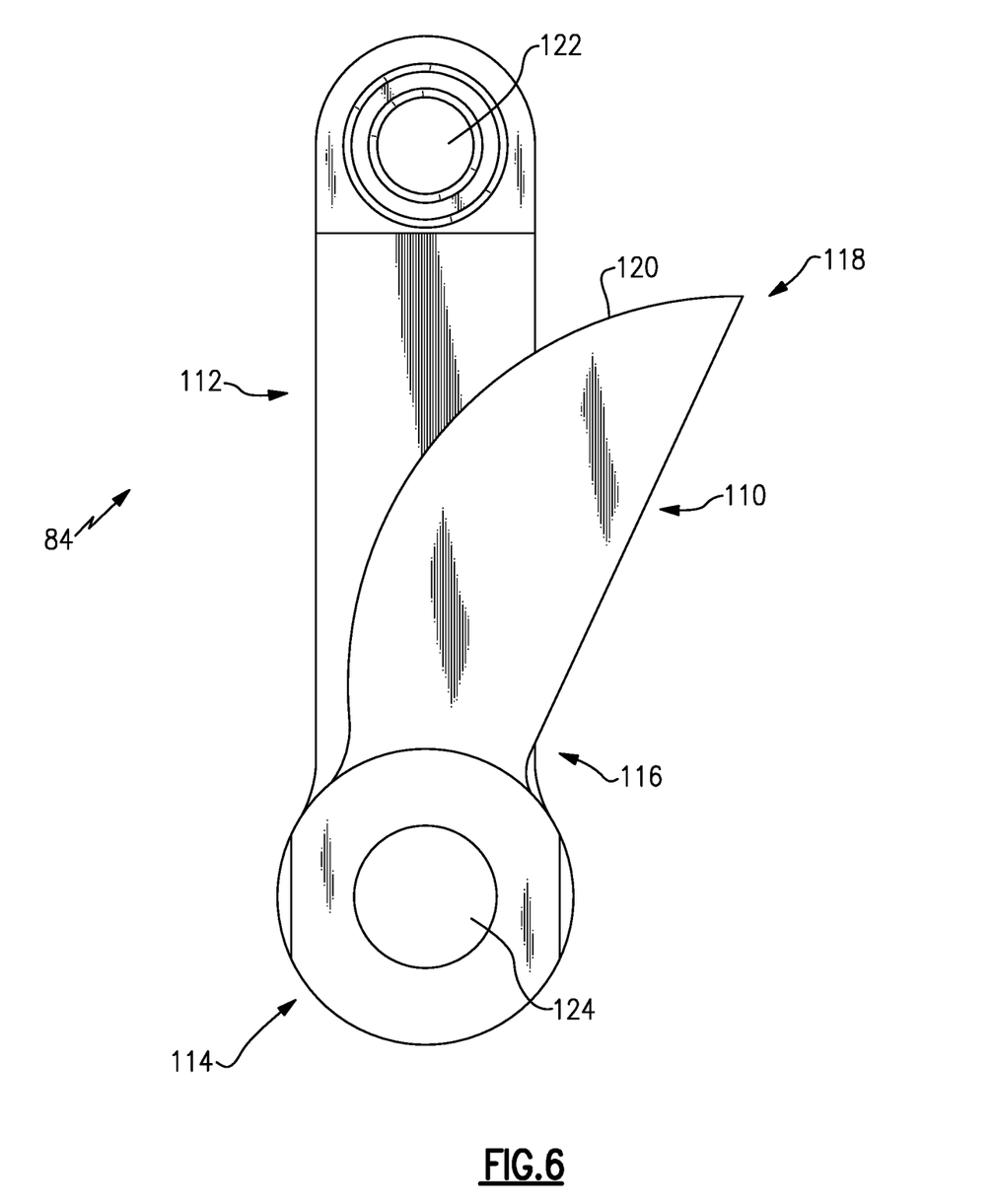
FIG. 6 illustrates another view of the example profiled bellcrank of FIG. 5.

FIG. 6 illustrates another view of the example profiled bellcrank 84. The rotation portion 114 includes a cylindrical opening 124 for providing rotational attachment to another component, such as the bar 98 shown in FIGS. 3 and 4A-4C to provide a fixed pivot point 85.

Figure 7:
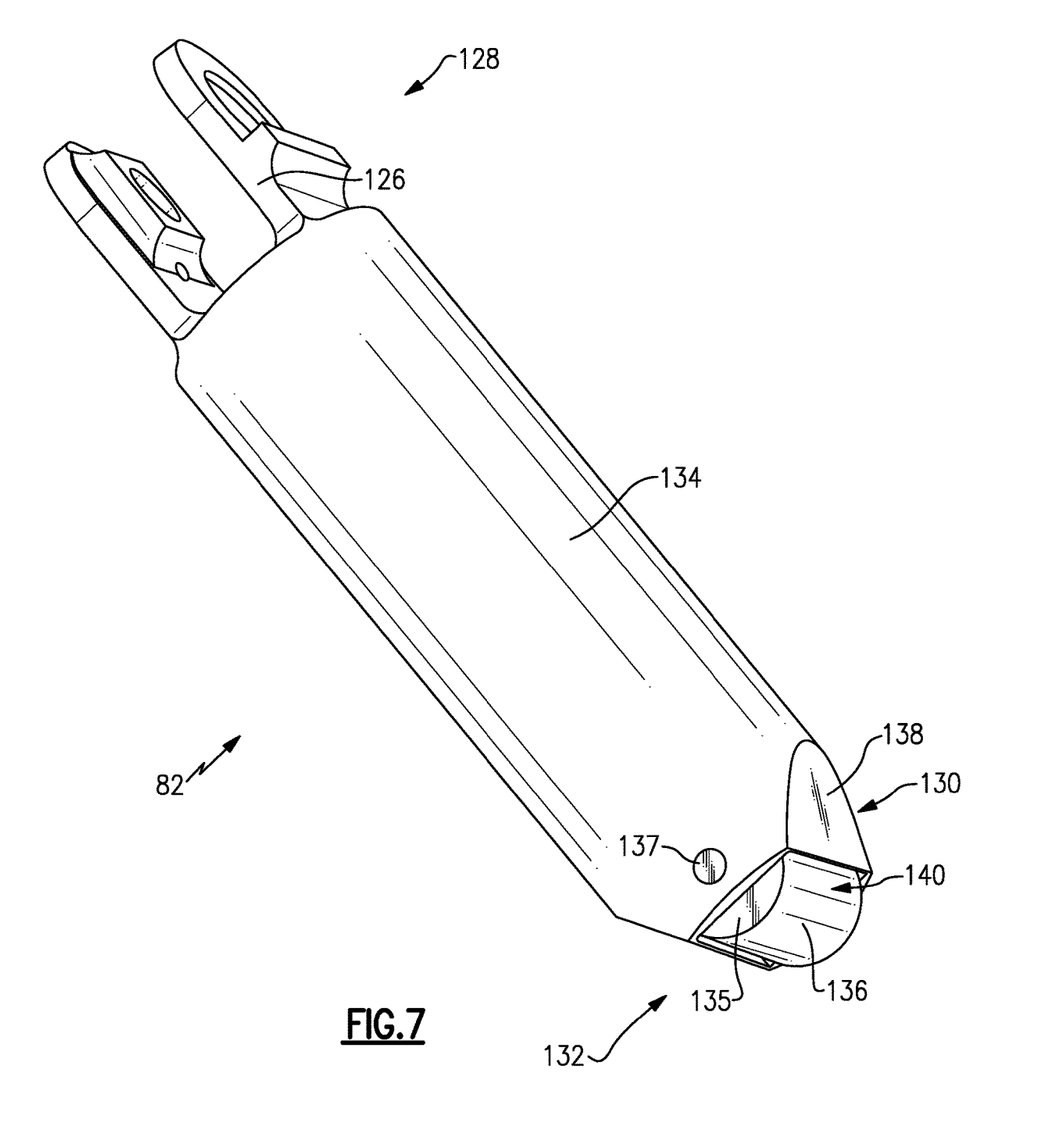
FIG. 7 illustrates an example follower.

FIG. 7 illustrates an example follower 82. The follower 82 includes a linking portion 126 at a first end 128 and an engagement portion 130 at a second end 132 opposite the first end 128. A main body portion 134, the example being cylindrical, extends between the linking portion 126 and the engagement portion 130. The linking portion 126 is configured to link with another component, such as the link 80 shown in FIG. 3, for example. The example engagement portion 130 includes a rotatable disk 135 having an outer surface 136 configured to engage with another component, such as the cam surface 120 of the profiled bellcrank 84 shown in FIGS. 3-6. The rotatable disk 135 may be rotatably received in a tapered portion 138 of the body extending from the main body portion 134. The example rotatable disk 135 may be rotatable about a pin 137. A portion 140 of the rotatable disk 135 extends beyond the tapered portion 138.

Figure 8:
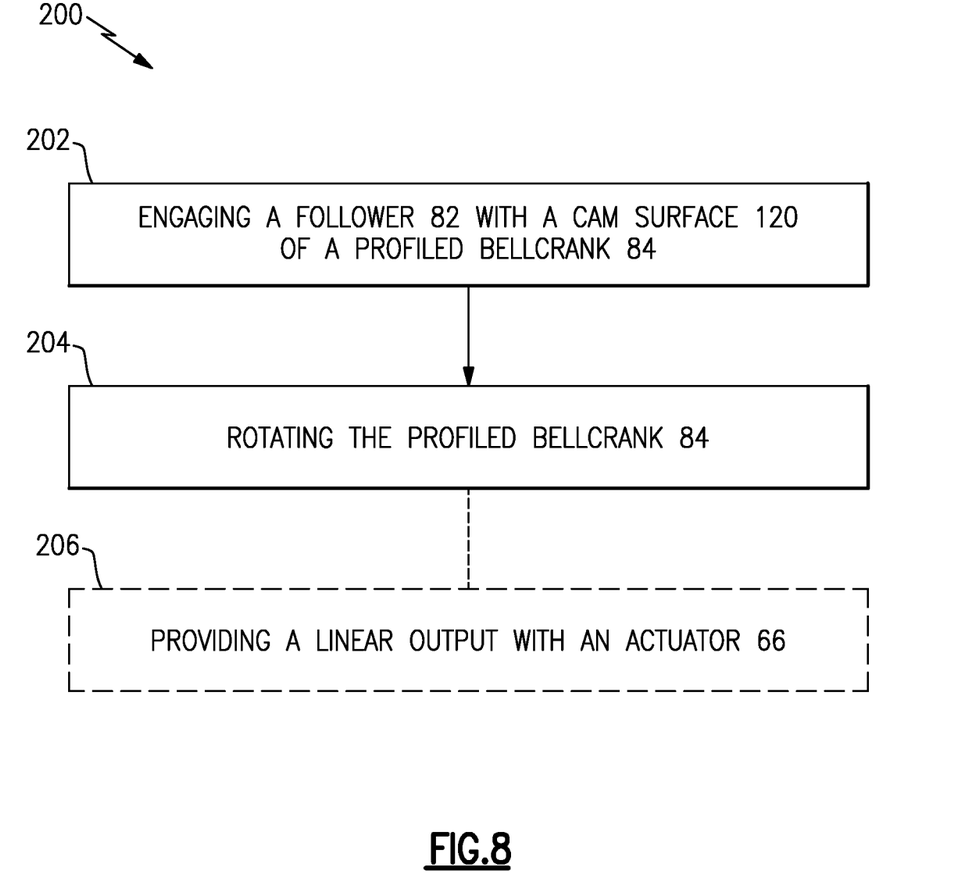
FIG. 8 illustrates a flowchart of an example method for adjusting a variable vane assembly.

FIG. 8 illustrates a flowchart of an example method 200 for adjusting a variable vane assembly, such as the variable vane assembly 60 disclosed. The step 202 includes engaging a follower 82 with a cam surface 120 of a profiled bellcrank 84. The step 204 includes pivoting the profiled bellcrank 84. The pivoting step 204 drives the follower 82 to move linearly. Linear movement of the follower 82 rotates the ring 78 through the link 80, and rotation of the ring 78 adjusts the variable vane 62 through the vane arm 76. The method 200 may further include the step 206 of providing a linear output with an actuator 66.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A variable vane assembly, comprising:
    an actuator;
    a connection linkage pivotable by the actuator;
    a profiled bellcrank including a linking arm coupled to the connection linkage for receiving direct input from the connection linkage and a profiled arm providing a cam surface;
    a driving linkage interfaced with the cam surface; and
    a variable vane coupled to the driving linkage, wherein pivoting of the bellcrank and cam surface causes the driving linkage to pivot the vane.

2. The variable vane assembly as recited in claim 1, wherein the profiled arm and the linking arm extend from a rotation portion, and the component is pivotable about a pivot point at the rotation portion.

3. The variable vane assembly as recited in claim 1, wherein the connection linkage includes a bellcrank coupled to a fourbar, the bellcrank is different from the profiled bellcrank, and the linking arm is coupled to the fourbar.

4. The variable vane assembly as recited in claim 1, wherein the driving linkage includes a follower having a rotatable disk that interfaces with the cam surface.

5. The variable vane assembly as recited in claim 4, wherein the driving linkage includes:
    a link coupled to the follower;
    a ring coupled to the link; and
    a vane arm coupled to the ring and the variable vane.

6. The variable vane assembly as recited in claim 5, wherein pivoting of the component causes the disk to rotate along the cam surface, which drives the follower to move linearly, linear movement of the follower rotates the ring through the link, and rotation of the ring pivots the variable vane through the vane arm.

7. The variable vane assembly as recited in claim 4, wherein the follower includes a main body portion and a tapered end portion extending from the main body portion, and the disk is received in the tapered end portion.

8. The variable vane assembly as recited in claim 1, wherein the cam surface is convex.

9. The variable vane assembly as recited in claim 1, wherein the driving linkage includes a follower having a rotatable disk interfaced with the cam surface.

10. The variable vane assembly as recited in claim 9, wherein the follower is movable within a fixed sleeve.

11. The variable vane assembly as recited in claim 10, wherein pivoting of the profiled bellcrank causes the disk to rotate along the cam surface, which drives the follower to move linearly within the fixed sleeve.

12. The variable vane assembly as recited in claim 11, wherein the cam surface is convex.

13. A gas turbine engine comprising:
    a compressor; and
    a variable vane assembly of the compressor, comprising
        an actuator;
        a connection linkage pivotable by the actuator;
        a component receiving direct input from the connection linkage and including a profiled arm providing a cam surface and a linking arm;
        a driving linkage including a follower having a rotatable disk interfaced with the cam surface; and
        a variable vane coupled to the driving linkage, wherein pivoting of the component and cam surface causes the driving linkage to pivot the vane.

14. The gas turbine engine as recited in claim 13, wherein the component is a profiled bellcrank.

15. The variable vane assembly as recited in claim 13, wherein the linking arm is coupled to the connection linkage.

16. The gas turbine engine as recited in claim 15, wherein the profiled arm and the linking arm extend from a rotation portion, and the component is pivotable about a pivot point at the rotation portion.

17. The gas turbine engine as recited in claim 13, wherein the driving linkage includes
   a link coupled to the follower;
   a ring coupled to the link; and
   a vane arm coupled to the ring and the variable vane.

18. The gas turbine engine as recited in claim 17, wherein pivoting of the component causes the disk to rotate along the cam surface, which drives the follower to move linearly, linear movement of the follower rotates the ring through the link, and rotation of the ring pivots the variable vane through the vane arm.

19. The gas turbine engine as recited in claim 18, wherein the follower moves linearly in a direction substantially tangential to the rotation of the ring.

20. A variable vane assembly, comprising:
   a linear actuator;
   a connection linkage including:
      a direct bellcrank having a first arm and a second arm, wherein the first arm receives input from the linear actuator; and
      a fourbar coupled to the second arm;
   a profiled bellcrank including
      a rotation portion providing a pivot point;
      a profiled arm providing a cam surface and extending from the rotation portion; and
      a linking arm extending from the rotation portion and coupled to the fourbar;
   a follower having a rotatable disk that interfaces with the cam surface, wherein the follower is linearly movable within a fixed sleeve;
   a link coupled to the follower;
   a ring coupled to the link;
   a plurality of vane arms coupled to the ring; and
   a variable vane coupled to each of the plurality of vane arms, wherein pivoting of the profiled bellcrank about the pivot point causes the disk to rotate along the cam surface, which drives the follower to move linearly within the sleeve, linear movement of the follower rotates the ring through the link, and rotation of the ring pivots each variable vane through the plurality of vane arms.

* * * * *